VENTURI LOADING SYSTEM

Original Filed Aug. 22, 1967 2 Sheets-Sheet 1

-INVENTOR
HAROLD F. SHROYER

BY Charles L. Harness
ATTORNEY

VENTURI LOADING SYSTEM

Original Filed Aug. 22, 1967 2 Sheets-Sheet 2

—INVENTOR
HAROLD F. SHROYER

BY Charles L. Harness

ATTORNEY

United States Patent Office

Re. 26,962
Reissued Oct. 6, 1970

26,962
VENTURI LOADING SYSTEM

Harold F. Shroyer, Sudbury, Mass., assignor to W. R. Grace & Co., New York, N.Y., a corporation of Connecticut Original No. 3,402,970, dated Sept. 24, 1968, Ser. No. 662,509, Aug. 22, 1967. Application for reissue Mar. 3, 1969, Ser. No. 806,752

Int. Cl. B65g *53/10*

U.S. Cl. 302—27 6 Claims

Matter enclosed in heavy brackets [ ] appears in the original patent but forms no part of this reissue specification; matter printed in italics indicates the additions made by reissue.

ABSTRACT OF THE DISCLOSURE

An apparatus for feeding polymeric beads into a board forming apparatus. It consists of a venturi chamber with directional air inlet nozzles and has a rectangular discharge end adapted to fit into the forming apparatus.

This invention relates to filling devices for continuous molding machines. In one particular aspect it relates to an air actuated filling device.

It is known to prepare foamed polymeric boards or sheets by the use of endless belts arranged to form an open ended molding space. The polymeric materials usually in the form of beads are fed into the space between the belts and steam is applied expanding the beads into the rectangular shape of the molding space.

One of the problems in the use of this molding technique is in the feeding of polymeric beads into the belt formed cavity. The beads must be uniformly distributed through the cavity to provide a uniform void free product. The conventional screw feed devices are deficient in that they tend to compress and compact the beads prior to feeding them between the belts.

It is therefore an object of this invention to provide a novel filling device whereby expandable polymeric beads are continuously fed into a belt forming cavity in a uniform manner without prior compression or compaction of the beads.

This and other objects of the invention will become apparent from the detailed description and drawings wherein.

Figure 1:
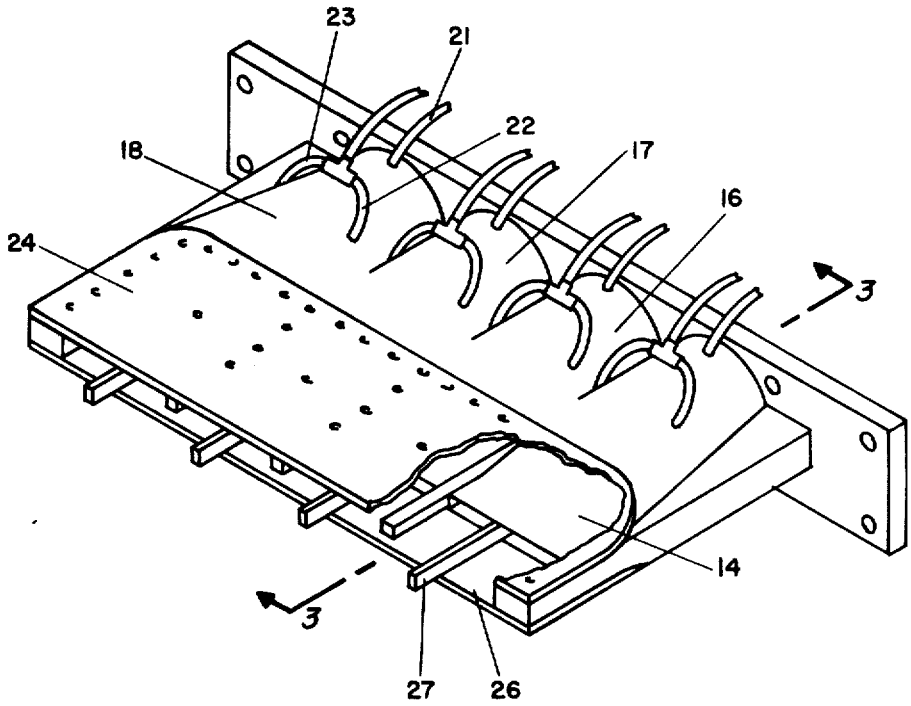
FIG. 1 is an isometric front view of the feed apparatus of this invention.
Figure 2:
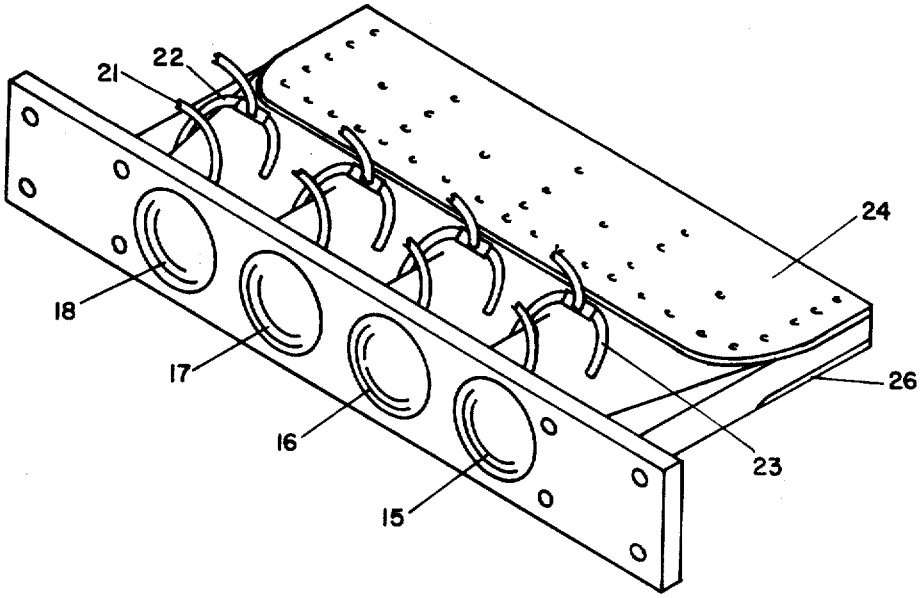
FIG. 2 is an isometric rear view of the feed apparatus of FIG. 1.

FIGS. 1 and 2 illustrate 4 feed conduits 14, 15, 16 and 17, which are unitized into feed apparatus 10. Conduits 14, 16, 17 and 18 are identical and a description of one is sufficient for an understanding, however, though 4 conduits are illustrated, this is not limitation on the invention. A feed conduit may be used by itself or in combination with others depending upon the width of the cavity formed by the belts in the board forming apparatus.

Conduit 14 is open ended and is cylindrical at the feed entrance end and rectangular at the feed discharge end. The rectangular shape of the discharge end allows the feed apparatus 10 to be inserted in the rectangular area 13 between belts 12—12 of the board forming apparatus.

Though the feed entrance end of conduit 14 is illustrated as being cylindrical, it is understood that it may be square or rectangular, without departing from the scope of the invention.

Figure 3:
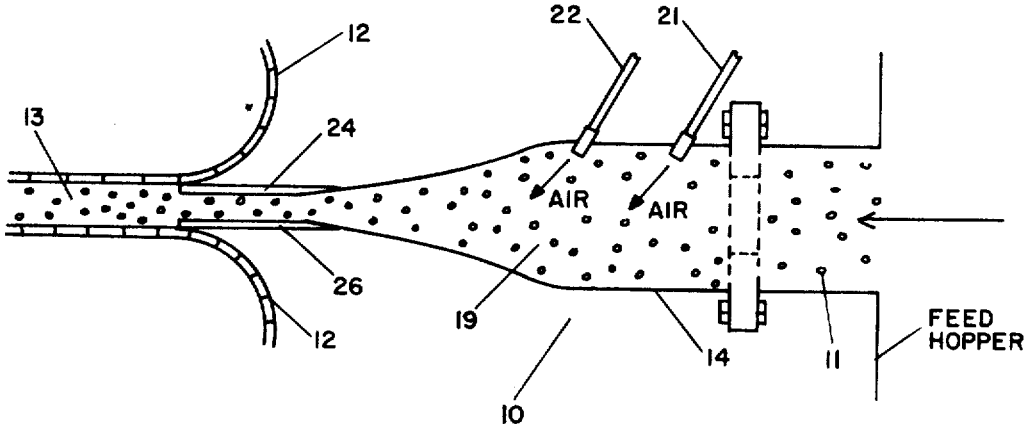
FIG. 3 is a sectional view of the apparatus of FIG. 1 through 3—3.

FIG. 3 illustrates feed conduit 14. It consists of a venturi chamber 19 and directed inlet nozzles 21, 22 and 23 (nozzles 21 and 22 only are shown in FIG. 3). The three nozzles and their relative locations in each of the conduits 14, 16, 17 and 18 give the desired dispersion of the polystyrene beads across the rectangular discharge end of each conduit of the feed apparatus 10.

The single nozzle 21 (in conduit 14) has the highest air velocity of the three nozzles and creates the initial suction to draw the polystyrene beads into the conduit 14. Nozzle 21 is located immediately anterior to the entrance end of the conduit 14. Nozzles 22 and 23 control the dispersion of the beads across the rectangular discharge end of conduit 14. They are located side by side approximately at the point where the venturi chamber 19 tapers from a cylinder to a rectangle.

In operation air flow from nozzles 21, 22 and 23 sucks beads 11 from a suitable container (not shown) into the venturi chamber 19 wherein they are dispersed and ejected into the board forming cavity 13 between belts 12—12.

In an embodiment of this invention plastic shields 24 and 26 are attached to the upper and lower surfaces respectively of the discharge end of conduits 14, 16, 17 and 18 to reduce the wear on the belts 14—14.

The novel feed apparatus of this invention is particularly useful when slats are used for the belts 12—12. When using a slat belt, the polystyrene beads have to be delivered beyond the open slat area, to the point where the slats are closed. Otherwise the beads enter between the slats creating a bead loss and wedge the slats further apart, stretching the belt. The high kinetic energy imparted to the beads by the air flow in the venturi chamber 19 carried the beads well into the closed slat area of the belt cavity 13.

An additional advantage of the novel feed operation is that the air flow from the venturi chamber 19 reduces the chances of the steam used in molding from entering the feed hopper and welding the polymeric beads en masse. A further advantage is the ease with which feed rate can be coordinated with belt speed.

What is claimed is:

1. In an apparatus for making coherent bodies from expandable granules of thermoplastic material comprising a channel defined by a plurality of movable endless belts, means for charging said channel with said expandable polymeric material, said charging means having [a plurality of conduits] *at least one conduit* leading into the entrance end of said channel, [each of] said [conduits] *conduit* containing as an integral part thereof an open end venturi chamber having an entrance end and a rectangular discharge end, a plurality of directional inlet nozzles in said venturi chamber for the passage of air under pressure into said chamber, whereby said air under pressure passing through said venture chamber sucks said polymeric material into said entrance end and ejects said material and air from said discharge end at high velocity into said belt formed channel.

2. The apparatus according to claim 1 wherein a plastic sheet is affixedly attached to the upper and lower surfaces of said discharge ends of said conduits to prevent said conduits from engaging said belts.

3. In an apparatus for making coherent bodies from expandable granules of thermoplastic material comprising a channel defined by a plurality of movable endless belts, means for charging said channel with said expandable polymeric material, said charging means having [a plurality of conduits] *at least one conduit* leading into the entrance end of said channel, [each of] said [conduits] *conduit* containing as an integral part thereof an open ended venturi chamber having a cylindrical entrance end and a rectangular discharge end, a first directional inlet nozzle anterior to said entrance end for the passage of air under pressure into said chamber, second and third directional inlet nozzles for the passage of air under pressure into said chamber, said second and third nozzle being side by side at the tapering of said [cyclindrical] *cylindrical* entrance end into said rectangular discharge end, whereby said air under pressure passing through said venturi chamber sucks said polymeric material into said entrance end and ejects said material and air from said discharge end at high velocity into said belt formed channel.

4. The apparatus according to claim 2 wherein a plastic sheet is affixedly attached to the upper and lower surfaces of said discharge ends of said conduits to prevent said conduits from engaging said belts.

*5. The apparatus of claim 1 wherein said charging means has a plurality of said conduits leading into the entrance end of said channel.*

*6. The apparatus of claim 3 wherein said charging means has a plurality of said conduits leading into the entrance end of said channel.*

References Cited

The following references, cited by the Examiner, are of record in the patented file of this patent or the original patent.

UNITED STATES PATENTS

| | | | |
|---|---|---|---|
| 1,892,920 | 1/1933 | Weiss | 302—25 |
| 3,065,500 | 11/1962 | Berner | 18—4 |
| 3,427,372 | 2/1969 | Berner | 264—51 |
| 1,964,726 | 7/1934 | Engstrand | 302—25 |
| 3,036,357 | 5/1962 | Cook et al. | 302—25 |

ANDRES H. NIELSEN, Primary Examiner

U.S. Cl. X.R.

264—51; 18—4